Figure 1:
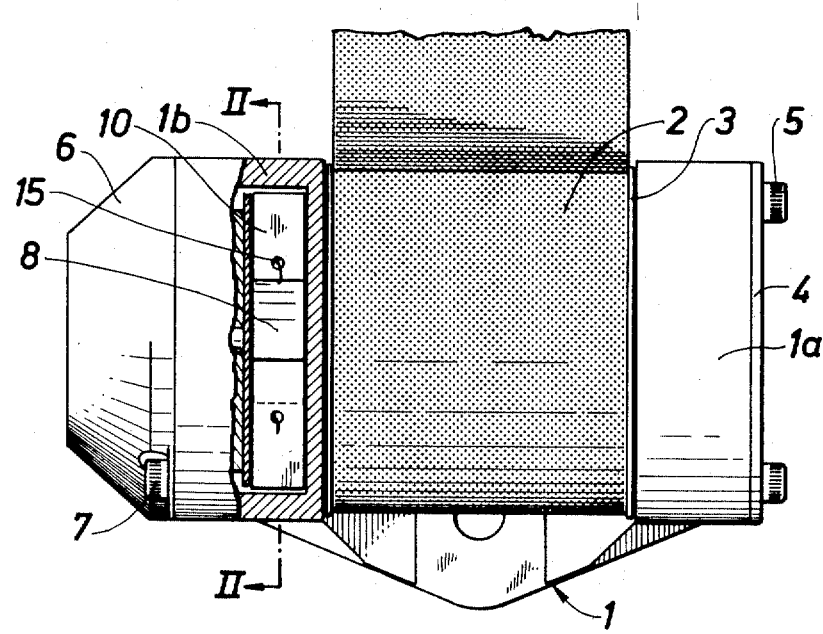

United States Patent [19]

Lindblad

[11] 3,871,600
[45] Mar. 18, 1975

[54] VEHICLE SAFETY BELT WITH INERTIA RESPONSIVE BRAKE

[76] Inventor: Stig Martin Lindblad, 440 20 Vargarda, Sweden

[22] Filed: Oct. 18, 1971

[21] Appl. No.: 189,916

[52] U.S. Cl. ............................................. 242/107.4
[51] Int. Cl. ............................................. B65h 75/48
[58] Field of Search.......... 242/107.3, 107.4, 107 A, 242/107 SB; 280/505 B; 297/385, 388

[56] References Cited
UNITED STATES PATENTS

| | | | |
|---|---|---|---|
| 2,403,653 | 7/1946 | Geohegan | 242/107.4 |
| 2,953,315 | 9/1960 | Lautier et al. | 242/107.4 |
| 3,058,687 | 10/1962 | Bentley | 242/107.4 |
| 3,202,379 | 8/1965 | Wrighton et al. | 242/107.4 |
| 3,339,030 | 8/1967 | Nilsson | 242/107.3 |
| 3,343,763 | 9/1967 | Spouge | 242/107.4 |
| 3,510,085 | 5/1970 | Stoffel | 242/107.4 |
| 3,593,942 | 7/1971 | Rex | 242/107.4 |

Primary Examiner—Billy S. Taylor
Attorney, Agent, or Firm—Linton & Linton

[57] ABSTRACT

A spring retracted seal belt is wound on a rotatable roller or spool. The spool is provided with a shaft having opposed V-shaped grooves. Each groove mounts a locking plate. The locking plates are commonly spring biased to a retracted position against one side of their respective grooves. An inertia member rotatable on the spool shaft is provided with slots aligned with shaft V-shaped grooves. The locking plates extend through said slots and normally rest in a chord-like orientation against one side of the V-shaped slots but clear of an internal braking surface on the housing. Sudden unwinding of the belt and its attendant relative shifting of the spool and inertia member causes the locking plates to shift to a more radial orientation and thereby be thrust against the braking surface to stop unwinding of the belt.

1 Claim, 3 Drawing Figures

VEHICLE SAFETY BELT WITH INERTIA RESPONSIVE BRAKE

The present invention is for a winding up device for safety belts mounted in vehicles, and having one belt part adapted to be wound off from a rotatable roller.

The object of the invention is to provide a device of this kind which is simple in manufacture, and dependable in use.

The invention is substantially characterized in that the winding up device comprises a central pin rotating together with said roller, and extending into a housing having a substantially cylindrical inner wall, one or several preferably plate shaped locking elements being pivoted relative to said pin against spring action, the extension of said locking elements outwardly from said pin being such that upon pivoting from their position of rest towards a substantially radial position relative to the pin and the housing the locking elements will be pressed against the cylindrical inner wall of the housing, said locking elements also being adapted to cooperate with an inertia element which upon a rapid acceleration of the rotation of said pin in the direction of winding up the belt will be caused by its inertia to engage said locking elements and move them to the position in which they are pressed against the housing wall.

Figure 2:
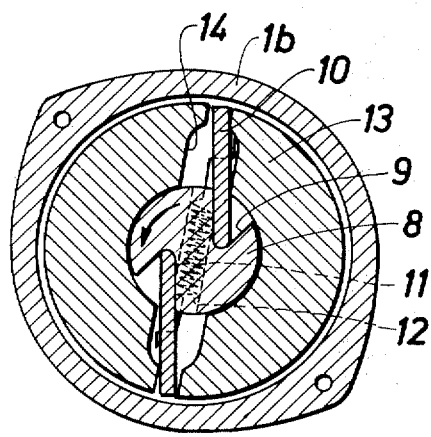
Figure 3:
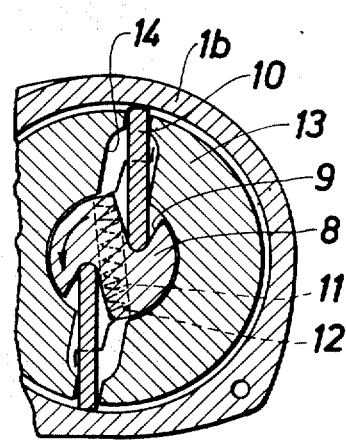

One embodiment of the invention will be described here below with reference to the accompanying drawing wherein FIG. 1 is a partly broken view of a winding up device according to the invention, FIG. 2 is a cross section taken on the line II—II in FIG. 1 with the locking mechanism in the inoperative position, and FIG. 3 is a cross-section corresponding to FIG. 2 with the locking device in its operating position.

In the drawing the winding up device is indicated as a whole at 1, and numeral 2 indicates a portion of a safety belting would up on a winding up roller 3. The winding up roller 3 is rotatably journalled on a central shaft against the action of a helical spring or the like not shown in the drawing. In the embodiment shown the helical spring is mounted in a housing 1a disposed to one side of the roller 3 and covered by a lid 4 which is secured to the housing by means of screws 5. To the other side of the roller 3 there is provided a second housing 1b which is closed by a lid 6 secured to the housing 1b by means of screws 7. A pin or stud shaft 8 rotating together with the roller 3 projects into the housing 1b and is provided with axially extending V-shaped grooves 9. Each of the grooves 9 has one edge portion of a plate shaped locking member 10 located therein allowing the locking members to be pivoted relative to the bottom of the grooves. A draw spring 11 is provided in a bore 12 extending diametrically to the pin 8 and has its ends connected to the locking plates 10 for maintaining the latter in the grooves 9. An inertia element 13 is freely rotatable around the pin 8 and is provided with openings 14 through which the locking elements can extend towards the cylindrical inner wall of the housing 1b. The inclination of the walls of the V-shaped grooves 9 and the length of the locking elements 10 are such that in the position shown in FIG. 2 the locking elements are slightly spaced from the cylindrical wall of the housing 1b whereas in the position illustrated in FIG. 3 the locking elements engage the wall of the housing. The locking elements 10 are normally maintained in the position illustrated in FIG. 2 i.e., when the roller 3 is at rest or rotates without rapid acceleration in the winding up direction which is indicated by the arrow in FIGS. 2 and 3. If, however, a heavy pull in the belt part 2 should cause the roll 3 and the pin 8 to accelerate rapidly, the inner force exerted by the inertia element 13 upon the locking members 10 will exceed the force excerted by the spring 11 so that the locking elements will be pivoted to the position illustrated in FIG. 3 in which they engage the inner wall of the housing 1b so that the pin 8 and thereby the winding up roll 3 will be prevented from rotating further. Consequently, further winding off of the belt 2 will not be possible. In the embodiment shown the spring 11 is secured to the locking elements 10 by means of Z-shaped end portions which are passed through bores 15 in the locking members.

The invention is not limited to the embodiment which has been described here inbefore and shown in the drawing as an example only and may be varied with respect to its details within the scope of the appended claims. Thus, as an example, the inner surface of the housing 1b may be provided with a suitable friction material or with serrations for increasing the friction.

As will appear from FIGS. 2 and 3 the extension of the locking elements 10 in the direction perpendicular to the pin 8 is such that the locking elements may not be pivoted to a position in which they are disposed radially relative to the pin.

I claim:

1. A winding-up device for a vehicle safety harness comprising a belt, a housing a shaft rotatably mounted in said housing, a roller mounted on said shaft for rotation therewith and having said belt partially wound thereon, said housing having a cavity defined by a cylindrical inner wall into which a portion of said shaft extends, said shaft portion having axially extending grooves each of a V-shaped cross-section, plates each having an end pivotally supported in one of said shaft grooves and extending in a transverse plane to said shaft, at least one spring tending to retain said plates in their respective shaft grooves, said plates each having a length in a direction from its respective shaft groove bottom exceeding the radial distance from its respective shaft groove bottom and said cylindrical inner wall, an inertia element rotatably mounted on said shaft portion and having radially directed openings through which said plates extend whereby said inertia element can engage said plates upon a rapid acceleration of said shaft in the belt winding-off direction of said roller causing said plates to pivot on said shaft groove bottoms into engagement with said cylindrical inner wall preventing further rotation of said roller, said shaft having at least one bore extending between a pair of said grooves, said spring being positioned in said bore and said spring having its ends connected to the plates in said pair of grooves tending to retain said plates against the bottom of their respective groove.

* * * * *